United States Patent
Filsfils et al.

(10) Patent No.: US 7,765,306 B2
(45) Date of Patent: Jul. 27, 2010

(54) TECHNIQUE FOR ENABLING BIDIRECTIONAL FORWARDING DETECTION BETWEEN EDGE DEVICES IN A COMPUTER NETWORK

(75) Inventors: Clarence Filsfils, Brussels (BE); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1043 days.

(21) Appl. No.: 11/342,446

(22) Filed: Jan. 30, 2006

(65) Prior Publication Data

US 2007/0180104 A1    Aug. 2, 2007

(51) Int. Cl.
G06F 15/16 (2006.01)
G06F 15/177 (2006.01)
(52) U.S. Cl. .................. 709/228; 709/207; 709/224
(58) Field of Classification Search .................. 709/203, 709/204, 212, 217, 223, 227, 231–232, 207, 709/224, 228
See application file for complete search history.

(56) References Cited

U.S. PATENT DOCUMENTS

| | | | |
|---|---|---|---|
| 5,519,704 A | 5/1996 | Farinacci et al. | |
| 6,763,479 B1 * | 7/2004 | Hebert | 714/4 |
| 7,386,610 B1 * | 6/2008 | Vekiarides | 709/224 |
| 2003/0233595 A1 | 12/2003 | Charny et al. | |
| 2004/0081154 A1 | 4/2004 | Kouvelas | |
| 2004/0218540 A1 | 11/2004 | Foschiano et al. | |
| 2005/0282218 A1 * | 12/2005 | Prober et al. | 435/6 |
| 2007/0180104 A1 * | 8/2007 | Filsfils et al. | 709/224 |

OTHER PUBLICATIONS

Ivan Pepelnjak and Jim Guichard, "MPLS and VPN Architectures", Chapters 8-9 pp. 145-205, Cisco Press 2001.

Stephen A. Thomas, "IP Switching and Routing Essentials", Chapter 7 pp. 221-243, 2002.

E. Rosen, Network Working Group RFC 2547, "BGP/MPLS VPNs", pp. 1-24, Mar. 1999.

D. Katz and D. Ward, Network Working Group Internet Draft, "Bidirectional Forwarding Detection (draft-ietf-bfd-base-04.txt)", pp. 1-42, Oct. 2005.

Y. Rekhter and T. Li, Network Working Group RFC 1771, "A Border Gateway Protocol 4 (BGP-4)", pp. 1-54, Mar. 1995.

Radia Perlman, "Interconnections Second Edition: Bridges, Routers, Switches, and Internetworking Protocols", Sections 12.1-12.3 pp. 299-324, Addison Wesley longman, Inc. 2000.

Andrew S. Tanenbaum, "Computer Networks", Fourth Edition, Section 1.4.2 pp. 41-44, Pearson Education 2003.

* cited by examiner

*Primary Examiner*—Hussein A. Elchanti
(74) *Attorney, Agent, or Firm*—Cesari and McKenna, LLP

(57) ABSTRACT

A technique enables bidirectional forwarding detection (BFD) between first and second edge devices in a computer network, wherein the second edge device is not configured for BFD. According to the novel technique, a BFD Echo session is established from the first edge device to the first edge device via the second edge device, i.e., along a monitored path (e.g., a single link). Also, an external border gateway protocol (eBGP) session is established between the first and second edge devices over an alternate path (e.g., an eBGP multi-hop session). The first edge device determines that the monitored path is down upon not receiving a returned BFD Echo message from the second edge device. In response, the first edge device notifies the second edge device that the monitored path is down through the eBGP session over the alternate path. Notably, upon notifying the second edge device that the monitored path is down, the first edge device breaks the eBGP session, and upon receiving the notification, the second edge device also breaks the eBGP session.

27 Claims, 6 Drawing Sheets

TECHNIQUE FOR ENABLING BIDIRECTIONAL FORWARDING DETECTION BETWEEN EDGE DEVICES IN A COMPUTER NETWORK

BACKGROUND OF THE INVENTION

1. Field of the Invention

The present invention relates to computer networks and more particularly to the use and enablement of bidirectional forwarding detection (BFD) between two devices in a computer network.

2. Background Information

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled Computer Networks, Fourth Edition, by Andrew Tanenbaum, published 2003, which is hereby incorporated by reference as though fully set forth herein. A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header.

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes within a routing domain are typically configured to forward data using predetermined paths from "interior gateway" routing protocols, such as conventional link-state protocols and distance-vector protocols. These interior gateway protocols (IGPs) define the manner with which routing information and network-topology information are exchanged and processed in the routing domain. The routing information exchanged (e.g., by IGP messages) typically includes destination address prefixes, i.e., the portions of destination addresses used by the routing protocol to render routing ("next hop") decisions. Examples of such destination addresses include IP version 4 (IPv4) and version 6 (IPv6) addresses. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. BGP is well known and generally described in Request for Comments (RFC) 1771, entitled *A Border Gateway Protocol 4 (BGP-4)*, by Y. Rekhter et al., published March 1995, which is publicly available through the Internet Engineering Task Force (IETF) and is hereby incorporated by reference in its entirety. External (or exterior) BGP (eBGP) is often used to exchange routing information across routing domain boundaries. Internal BGP (iBGP) is a variation of the eBGP protocol and is often used to distribute inter-network reachability information (address prefixes) among BGP-enabled edge devices situated within the same routing domain. BGP generally operates over a reliable transport protocol, such as TCP, to establish a TCP connection/BGP session. BGP also may be extended for compatibility with services other than standard Internet connectivity. For instance, Multi-Protocol BGP (MP-BGP) supports various address family identifier (AFI) fields that permit BGP messages to transport multi-protocol information, such as is the case with RFC 2547 services, discussed below. Notably, the BGP session may be a multi-hop BGP session, such as where there are intermediate nodes/devices between the edge devices. A multi-hop BGP session is generally known to those skilled in the art as a BGP session encapsulated in a transport protocol (e.g., TCP/IP packets) between the devices. In this way, two BGP devices that either are or are not immediately adjacent may still maintain a BGP session through other intermediate nodes/devices.

A network node within a routing domain may detect a change in the domain's topology. For example, the node may become unable to communicate with one of its neighboring nodes, e.g., due to a link failure between the nodes or the neighboring node failing, such as going "off line," etc. If the detected node or link failure occurred within the routing domain, the detecting node may advertise the intra-domain topology change to other nodes in the domain using IGP messages. Similarly, if an edge device detects a node or link failure that prevents communications with a neighboring routing domain, the edge device may disseminate the inter-domain topology change to other edge devices within its routing domain (e.g., using the iBGP protocol). In either case, propagation of the network-topology change occurs within the routing domain and nodes in the domain thus converge on a consistent view of the new network topology, i.e., without the failed node or link.

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS enables network nodes to forward packets along predetermined "label switched paths" (LSP). Each LSP defines a logical data path, or virtual circuit, between a pair of source and destination nodes; the set of network nodes situated along the LSP may be determined using reachability information provided by conventional IGPs, such as OSPF, Intermediate-System-to-Intermediate-System (IS-IS), etc. Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label-lookup operation to determine a packet's next-hop destination. MPLS traffic engineering provides additional advantages over IP-based routing, such as enabling MPLS-configured nodes to reserve network resources, such as bandwidth, to ensure a desired quality of service (QoS).

Each destination represented via a LSP is associated with a locally allocated label value at each hop of the LSP, such that the locally allocated label value is carried by data packets forwarded over its associated hop. The MPLS label values are typically distributed among the LSP's nodes using, e.g., the Label Distribution Protocol (LDP), Resource Reservation Protocol (RSVP) or MP-BGP protocol. Operationally, when a data packet is received at a MPLS-configured node, the node extracts the packet's transported label value, e.g., stored at a known location in the packet's encapsulating headers. The extracted label value is used to identify the next network node to forward the packet. The packet may contain a "stack" of labels such that the stack's top-most label determines the packet's next-hop destination. The packet's extracted label value is replaced with a new label value associated with the packet's next hop. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The customer site may be multi-homed to the provider network, i.e., wherein one or more of the customer's CE devices is coupled to a plurality of PE devices, thus providing a redundant connection. The PE and CE devices are generally intermediate network nodes, such as routers or switches, located at the edge of their respective networks. PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols, such as BGP, OSPF, IS-IS, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise'various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

As those skilled in the art will understand, it is desirable to quickly detect the failure of a PE-CE link (or other inter-domain link) so that minimal traffic is lost. Conventionally, since a BGP session is often employed between the two inter-domain devices (e.g., a PE device and a CE device), BGP KEEPALIVE messages may be used to determine whether the peers are reachable (e.g., for link or node failure). For instance, BGP may specify a Hold Time interval, the expiration of which indicating that an error has occurred within the BGP session (e.g., at least three seconds). Each BGP message received at a device resets the Hold Time. A BGP KEEPALIVE message may be exchanged between the devices of the BGP session to reset the Hold Time. As such, the interval between exchanged KEEPALIVE messages must be often enough as not to cause the Hold Timer to expire. Conventionally, a reasonable maximum time between KEEPALIVE messages would be one third of the Hold Time interval. However, according to the BGP standard set forth in RFC 1771, the KEEPALIVE messages must not be sent more frequently than one per second, e.g., in order to minimize traffic between the BGP devices. Notably, in the event the Hold Time has expired, the devices may "break" (i.e., tear down or close) the BGP session.

Because of the increasing need for faster network response time and convergence, administrators often require the ability of individual network devices to quickly detect failures. Bidirectional Forwarding Detection (BFD) provides rapid failure detection times between devices, while maintaining low overhead. For instance, BFD failure detection may be as fast as 50 milliseconds (ms), while the BGP method described above is on the order of seconds (e.g., three seconds). BFD verifies connectivity between two devices based on the rapid transmission of BFD control packets between the two devices (e.g., little to no BFD holdtime, as will be understood by those skilled in the art). Notably, BFD also provides a single, standardized method of link/device/protocol failure detection at any protocol layer and over any media. A secondary benefit of BFD, in addition to fast failure detection, is that it provides network administrators with a consistent method of detecting failures. Thus, one availability methodology could be used, regardless of the protocol (e.g., IGP, BGP, etc.) or the topology of the network. BFD is further described in Katz, et al. *Bidirectional Forwarding Detection <draft-ietf-bfd-base-04.txt>*, Internet Draft, October, 2005, the contents of which are hereby incorporated by reference as though fully set forth herein.

Currently, a problem with using BFD in networks is that not all devices in the networks are enabled for BFD operation. Configuring all network devices for BFD can be time consuming and/or costly for network administrators. For example, in the case of MPLS/VPN networks mentioned above, PE devices of the provider network may number in the hundreds, while CE devices of the customer networks may reach into the hundreds of thousands. Because large amounts of traffic generally traverse PE-CE links, fast convergence of the network is desirable after a PE-CE link failure. Unfortunately, due to the large number of CE devices, many CE devices are not configured for BFD. PE devices, on the other hand, may more often (or perhaps more readily) be configured for BFD.

One configuration option for use with a single BFD enabled device is a BFD Echo function. When the Echo function is active (i.e., an "Echo session"), BFD Echo messages, e.g., a single Echo packet or a stream of Echo packets, are transmitted from a first device (e.g., a PE device) in such a way as to have a second device (e.g., a CE device) loop the Echo message back to the first device. This alleviates requirements for the second device to examine the contents of the Echo message, which also saves overall BFD processing time. If the Echo message (or a number of Echo packets of the message) is is not returned to the first device, the session is declared to be down by the first device.

While the Echo function is successful for providing BFD capability and benefits for BFD enabled devices (e.g., PE devices), it does not provide the benefits to devices not configured for BFD (e.g., CE devices). For instance, while one enabled device is responding to the rapid indication of link failure, the other non-configured device may remain unaware of the failure, e.g., until another mechanism detects the failure. Although eventually both devices detect the failure, only one device benefits from the fast failure detection afforded by BFD (e.g., 50 ms response time). There remains a need, therefore, for a technique to enable BFD for both a first and second device when the second device is not configured for BFD.

SUMMARY OF THE INVENTION

The present invention is directed to a technique for enabling bidirectional forwarding detection (BFD) between first and second edge devices in a computer network, wherein the second edge device is not configured for BFD. According to the novel technique, a BFD Echo session is established from the first edge device to the first edge device via the second edge device, i.e., along a monitored path (e.g., a single link). Also, an external border gateway protocol (eBGP) session is established between the first and second edge devices over an alternate path (e.g., an eBGP multi-hop session). The first edge device determines that the monitored path is down upon not receiving a returned BFD Echo message from the second edge device. In response, the first edge device notifies the second edge device that the monitored path is down through the eBGP session over the alternate path. Notably, upon notifying the second edge device that the monitored path is down, the first edge device breaks the eBGP session, and upon receiving the notification, the second edge device also breaks the eBGP session.

In accordance with one aspect of the present invention, redundant connectivity is configured between the edges of two networks, e.g., two autonomous systems (ASes). Illustratively, one or more provider edge (PE) devices of a provider network (e.g., one of which is the first edge device) are redundantly connected to one or more customer edge (CE) devices of a customer network (e.g., one of which is the second edge device), such as, e.g., for redundant virtual private network (VPN) sites. An address "X" of the first edge device may be reachable only by the second edge device, so the monitored path is the only path to reach address X. An address "Y" of the second edge device (e.g., a loopback address) may be reachable by at least some neighboring redundancy (e.g., multi-hop) nodes, in order to create at least one alternate path between the two devices that does not include the monitored path.

In accordance with another aspect of the present invention, the first edge device may be configured with a BFD Echo session from X to X, such that BFD Echo messages sent from the first edge device to the second edge device are simply returned to the first edge device over the monitored path (i.e., without having been processed by the second edge device). Also, an eBGP multi-hop session may be established between the first and second edge devices, such that the eBGP multi-hop session is over the alternate path (i.e., not including the monitored path).

In accordance with yet another aspect of the present invention, to detect the status of the monitored path, the first edge device observes the BFD Echo messages. While the first edge device continues to receive the returned BFD Echo message, the monitored path is determined to be operational. In the event, however, that the first edge device does not receive a returned BFD Echo message, the first edge device determines that the monitored path is down (i.e., has failed). In response to the failure, the first edge device then sends a notification to the second edge device through the eBGP session over the alternate path, and breaks (tears down) the eBGP session. Through the alternate path, the second edge device learns that the monitored path has failed, and also breaks the eBGP session. Therefore, the first and second edge devices both detect the failure in substantially no BFD holdtime.

Advantageously, the novel technique enables BFD between first and second edge devices in a computer network, wherein the second edge device is not configured for BFD. By observing BFD Echo messages at a first edge device and sending notification of failure to a second edge device through an established eBGP session, the novel technique allows for the operation (and resultant benefits) of BFD between the two devices even though the second edge device is not configured for BFD. Also, the single edge device configuration for BFD obviates the requirement to configure all edge devices with BFD, thereby possibly saving time and money for network administrators (e.g., by configuring PE devices and not CE devices).

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
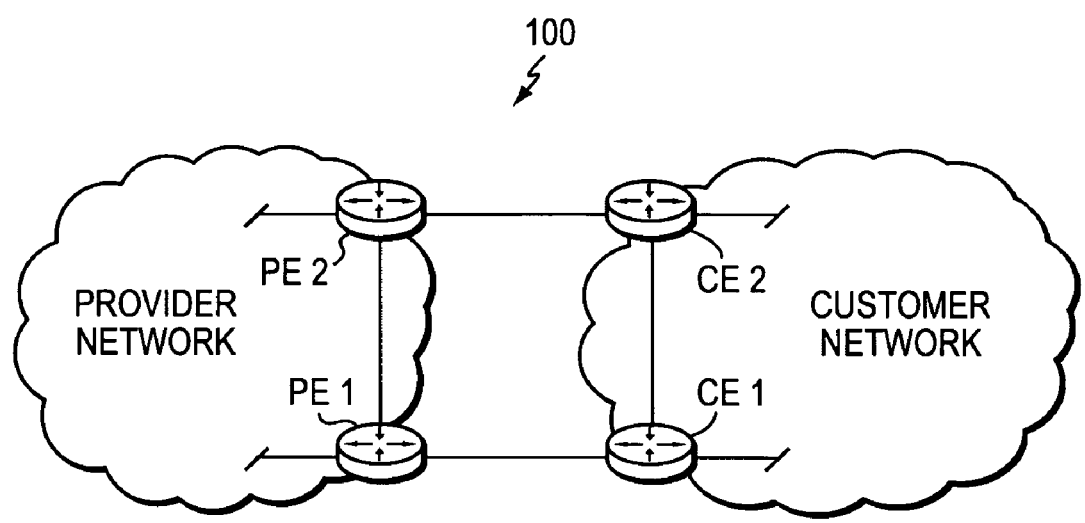
FIG. 1 is a schematic block diagram of an exemplary computer network that may be advantageously used with the present invention.

FIG. 1 is a schematic block diagram of an exemplary computer network 100 comprising a provider network, (e.g., a service provider network) interconnected to one or more customer networks. Although the provider and customer networks are described illustratively herein as autonomous systems, those skilled in the art will appreciate that they may be configured as one or more routing domains or other networks or subnetworks. The provider network comprises one or more network nodes, including a set of communicating border nodes or routers (illustratively, provider edge devices, or "PE devices") PE1 and PE2, through which client communications, such as data packet traffic, can pass into and out of the provider network. The customer network also comprises one or more network nodes, including a set of communicating border nodes or routers (illustratively, customer edge devices, or "CE devices") CE1 and CE2, through which client communications can pass into and out of the customer network. For example, the PE devices and CE devices may be configured as redundant connections to/from one or more virtual private networks (VPNs), as will be understood by those skilled in the art. Illustratively, the edge devices are shown connected in a conventional "square" configuration, comprising links PE1-PE2, PE2-CE2, CE2-CE1, and CE1-PE1. Notably, the links may also be represented as PE2-PE1, CE2-PE2, etc., and the order of the link end nodes is equally interchangeable herein. These examples are merely representative. Those skilled in the art will understand that any number of routers, nodes, links, and provider/customer networks may be used in the computer network 100 and connected in a variety of ways, including configurations other than the "square" configuration, and that the view shown herein is for simplicity.

Data packets may be communicated by the provider and customer networks using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within a provider or customer network may rely on predetermined "interior" gateway protocols (IGPs), such as conventional link-state or distance-vector protocols. In addition, data packets containing network topology information may be exchanged among provider and customer networks using "external" gateway protocols, such as the Border Gateway Protocol (BGP). Those skilled in the art will understand that other communication protocols may be used within and among the networks, and that those mentioned above are merely representative.

Figure 2:
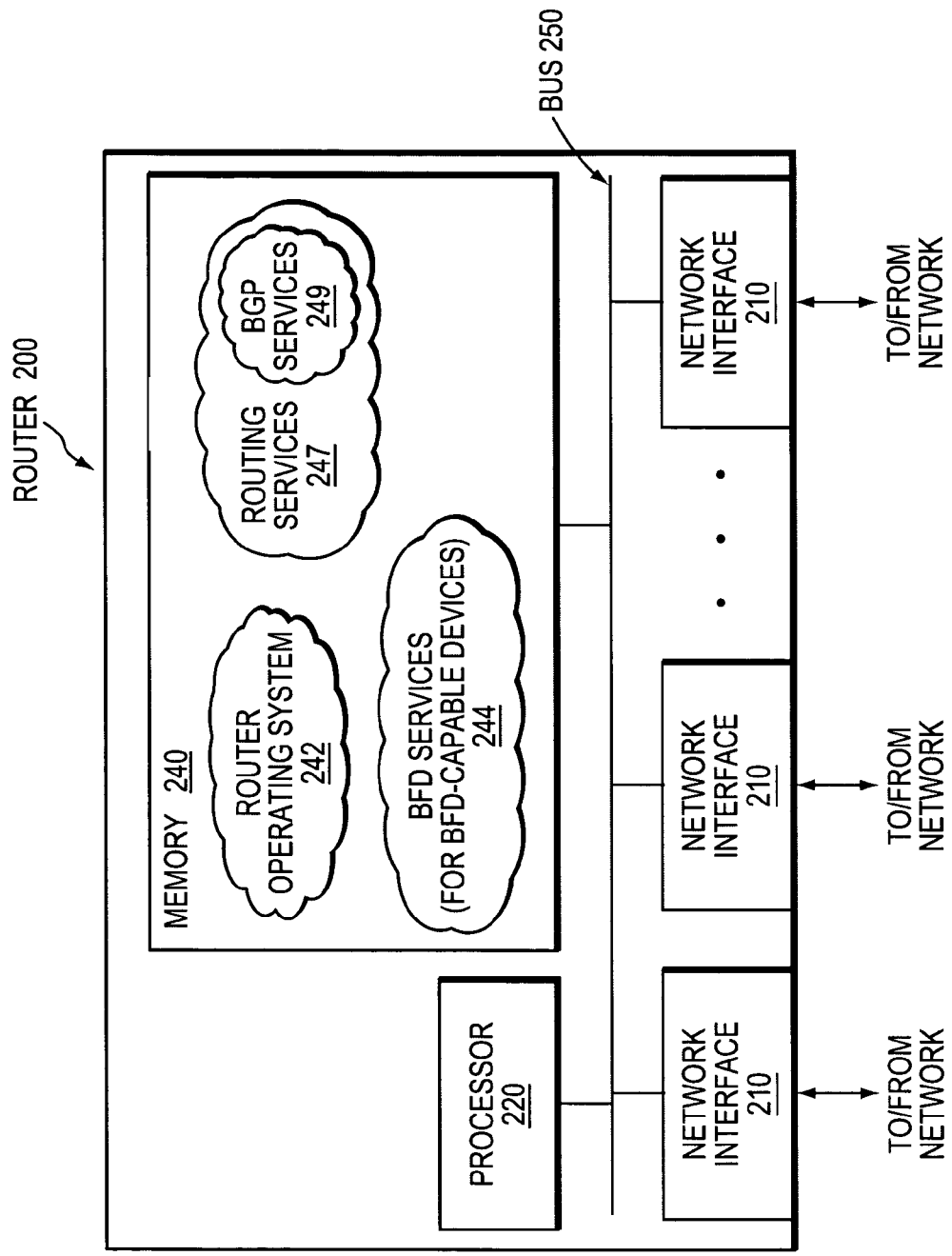
FIG. 2 is a schematic block diagram of an exemplary edge device that may be advantageously used with the present invention.

FIG. 2 is a schematic block diagram of an exemplary node/router 200 that may be advantageously used with the present invention, such as, e.g., an edge device. The node comprises a plurality of network interfaces 210 (e.g., line cards), a processor 220, and a memory 240 interconnected by a system bus 250. The network interfaces 210 contain the mechanical, electrical and signaling circuitry for communicating data over physical links coupled to the network 100. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing tables or virtual routing tables (not shown). A router operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include bidirectional forwarding detection (BFD) services 244 (for BFD capable devices), routing services 247, and BGP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP (e.g., as BGP services 249), etc. These functions may be configured to manage a forwarding information database (not shown) containing, e.g., data used to make forwarding decisions. Routing services 247 may also perform functions related to virtual routing protocols, such as maintaining virtual routing/forwarding (VRF) instances (not shown), etc., as will be understood by those skilled in the art.

BGP services (or process) 249 may be used during communication of network reachability information among devices 200 between the domains, such as through the transmission and analysis of BGP advertisements. Suppose, for example, that a new address prefix is established within an AS or a new connection is created between two or more ASes (e.g., the provider network and/or the one or more customer networks). Once the change in the network's state is detected by one of the BGP enabled devices, that device may transmit a BGP advertisement communicating the change to the other ASes. BGP services 249 of other network nodes receive the advertisements, update their internal routing/reachability information, and may continue to transmit BGP advertisements with the new information as understood by those skilled in the art.

During the course of a BGP session, however, errors may occur that prevent the BGP services 249 from continuing its operation. Example errors may be corrupted or improper data, or expiration of a Hold Timer indicating inactivity for an unwarranted length of time, etc. When an error occurs, BGP services 249 may transmit a BGP NOTIFICATION message to its peer. Notably, upon transmitting a BGP NOTIFICATION message, the transmitting device conventionally closes (breaks) the BGP session (e.g., substantially immediately), according to current BGP practices set forth in RFC 1771.

Figure 3:
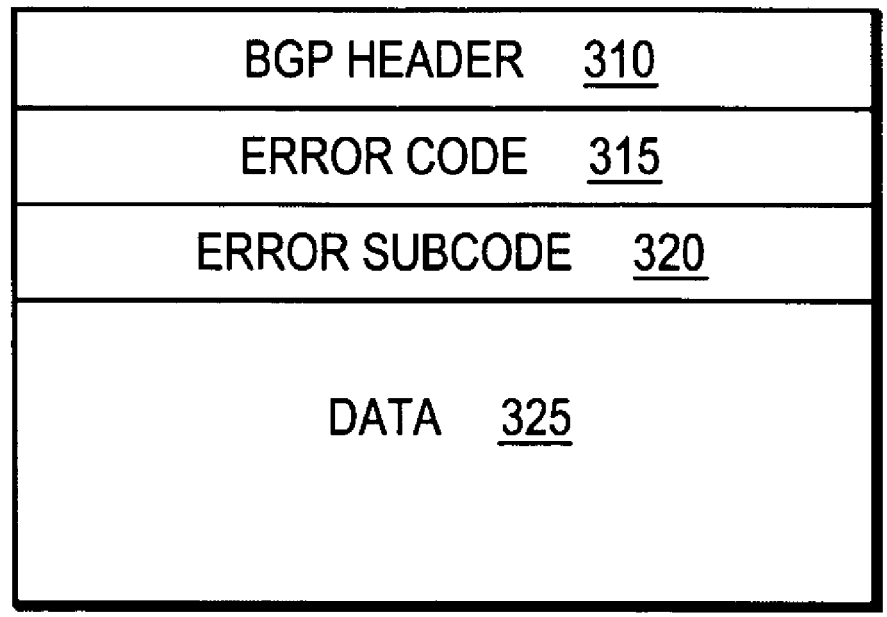
FIG. 3 is a schematic block diagram of an exemplary BGP message that may be used in accordance with the present invention.

FIG. 3 illustrates an exemplary BGP message 300 that may be transmitted by BGP enabled devices 200. Illustratively, the BGP advertisement 300 is a BGP NOTIFICATION message, and those skilled in the art will understand that other BGP messages may comprise other fields accordingly. The message 300 includes a BGP header 310, error code field 315, error subcode field 320, and a data field 325. The BGP header 310 contains the type of BGP message (e.g., a NOTIFICATION message), the overall length of the message, and other known information, such as predictable authentication data. The error code field 315 indicates the type of error notification contained within the message 300, such as, e.g., a Message Header Error, an OPEN Message Error, an UPDATE message error, a Hold Timer Expired notification, a Finite State Machine Error, a Cease notification, etc., or a BFD Failure notification in accordance with the present invention, as described below. Error subcode field 320 provides more specific information about the nature of the reported error, and is associated with a particular error code field value 315. The data field 325 is a variable-length field that may be used to diagnose the reason for the notification, depending upon the error code and subcode fields.

BFD services (or process) 244 (i.e., in BFD configured/capable devices) contain computer executable instructions executed by processor 220 to verify connectivity between two systems/devices, depending on the transmission of BFD control packets ("BFD messages") between the two devices. Assume, for example, that PE1 (configured for BFD) wishes to verify its connectivity to CE1 using BFD. PE1 may transmit a BFD message to CE1, and PE1 verifies connectivity based on response/non-response from CE1. In the event CE1 is also configured for BFD, CE1 may return a response BFD message to PE1. In the event, however, that CE1 is not configured for BFD, as is illustratively the case according to the present invention, PE1 must send a BFD Echo message to CE1, which CE1 returns to PE1 without examining/analyzing the message.

Figure 4:
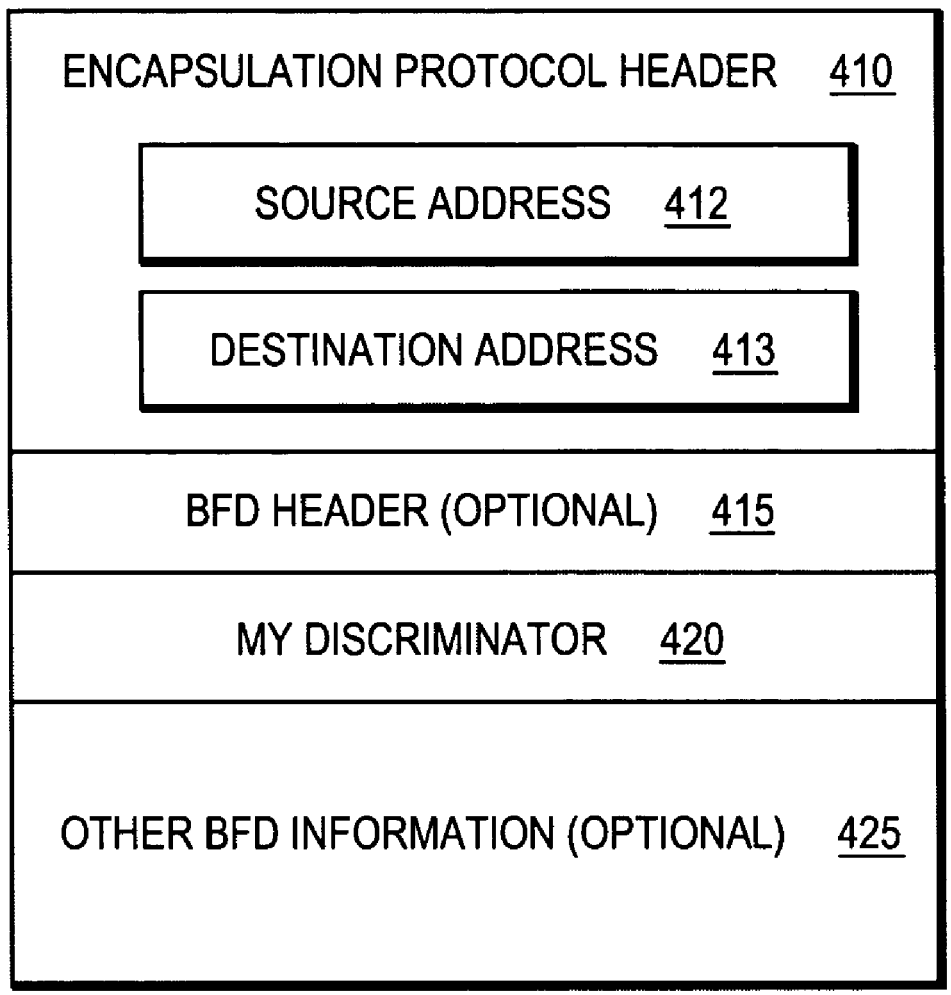
FIG. 4 is a schematic block diagram of an exemplary BFD message that may be used in accordance with the present invention.

FIG. 4 illustrates an exemplary BFD message 400 that may be transmitted by BFD capable devices 200. Illustratively, the BFD message 400 is a BFD Echo message, and those skilled in the art will understand that other BFD messages may comprise other fields accordingly. The message 400 includes an encapsulation protocol header 410, optional BFD header 415, a discriminator (e.g., a "My Discriminator") field 420, and an optional field for other BFD information 425. As those skilled in the art will understand, BFD Echo messages are sent in an encapsulation appropriate to the environment (e.g., TCP/IP, MPLS, etc.). Thus, the encapsulation protocol header 410 contains information standard for the specific type of encapsulation. Notably, for BFD Echo messages in particular, a source address 412 and destination address 413 within the header may both be a network address for the sending device (e.g., PE1). For example, the sending device may send the Echo message 400 to its returning peer device (e.g., CE1) with a destination address of itself, such that the returning device simply forwards the Echo message back to the sending device, e.g., without having to examine/analyze the message. In this way, the returning peer device need not be configured for BFD for an Echo session to be operational for the sending device.

The payload of a BFD Echo message is a local matter, since only the sending device processes the content. The optional BFD header field 415 may comprise standard BFD header information, such as, e.g., a BFD version number, a message length, certain flags, etc., or other information (more or less) as configured by the sending device. Because a sending device may have more than one Echo session at a time (e.g., with the same returning device, or other returning devices), the discriminator field 420 contains sufficient information to demultiplex the received (returned) Echo message 400 to the correct BFD Echo session once it has been returned to the sender. An example discriminator may be an opaque value that identifies each BFD session, and which is unique among all BFD sessions at the sending device. Also, an optional other BFD information field 425 may be used for any purpose as deemed appropriate by the sending device. Notably, BFD may operate across any number of links and at any protocol layer, e.g., Physical, Data Link, Network, Virtual, etc., as will be understood by those skilled in the art.

The present invention is directed to a technique for enabling BFD between first and second edge devices in a computer network, wherein the second edge device is not configured for BFD. According to the novel technique, a BFD Echo session is established from the first edge device to the first edge device via the second edge device, i.e., along a monitored path (e.g., a single link). Also, an external BGP (eBGP) session is established between the first and second edge devices over an alternate path (e.g., an eBGP multi-hop session). The first edge device determines that the monitored path is down upon not receiving a returned BFD Echo message from the second edge device. In response, the first edge device notifies the second edge device that the monitored path is down through the eBGP session over the alternate path. Notably, upon notifying the second edge device that the monitored path is down, the first edge device breaks the eBGP session, and upon receiving the notification, the second edge device also breaks the eBGP session.

In accordance with one aspect of the present invention, a redundant connectivity is configured between the edges of two networks, e.g., two ASes. Illustratively, one or more PE devices of a provider network (e.g., one of which is the first edge device) are redundantly connected to one or more CE devices of a customer network (e.g., one of which is the second edge device) as shown in FIG. 1, such as, e.g., for redundant VPN sites. Again, although the network in FIG. 1 is shown as a "square" topology, those skilled in the art will understand that any configuration may be used, so long as PE1 (the first edge device) has at least two distinct paths to CE1 (the second edge device). For example, the paths may be redundant direct links for PE1-CE1 (e.g., PE1-CE1 and a not shown PE1'-CE1'), a "triangular" topology (e.g., PE1-CE1, PE1-PE2, and a not shown PE2-CE1), more than the number of links shown, etc., as will be understood by those skilled in the art.

An address "X" of the first edge device (e.g., PE1) may be reachable only by the second edge device, so the monitored path is the only path to reach address X. For example, the address X may only be advertised for PE1's interface to CE1 (i.e., for PE1-CE1), such that CE1 only has one route to reach address X. Illustratively, address X may not be advertised by PE1 to any other PEs (or other devices of the provider network), so that the address X is not advertised outside of the provider network to other CE devices. For instance, CE2 will not learn any path to X via PE2, and the only path to X from the customer network, even as a redundant site, remains the PE1-CE1 path. Note that it is necessary for only CE1 to reach PE1's X address for the present invention (and BFD Echo sessions, generally) to ensure that returned Echo messages only have one path to reach PE1. Otherwise, returned echo messages may find other backup paths to PE1, and contradict the BFD failure detection. Note also that PE1's address X, as will be understood by those skilled in the art, may be in a virtual routing/forwarding (VRF) context with CE1, e.g., where the provider and customer networks are a redundant VPN site.

An address "Y" (e.g., a loopback address) of the second edge device (e.g., CE1) may be reachable by at least some neighboring redundancy (e.g., multi-hop) nodes, in order to create at least one alternate path between the two devices that does not include the monitored path. Generally, a loopback address is a specific address of a node that is reachable via any physical interface of a node (i.e., a "router ID"). Particularly, using a loopback address for CE1 permits neighboring nodes to reach CE1 regardless of which interfaces are operational at the time of transmission. Illustratively, the address Y may be advertised by CE1 to PE1, CE2 to PE2, thus making two paths available from the provider network to CE1 within the customer network (i.e., PE1-CE1 and PE2-CE2). PE1, specifically, has two distinct paths to CE1, namely PE1-CE1, and PE1-PE2-CE2-CE1. Again, as will be understood by those skilled in the art, address Y of CE1 may be in a VRF context with PE1 when applied to VPN sites.

Figure 5:
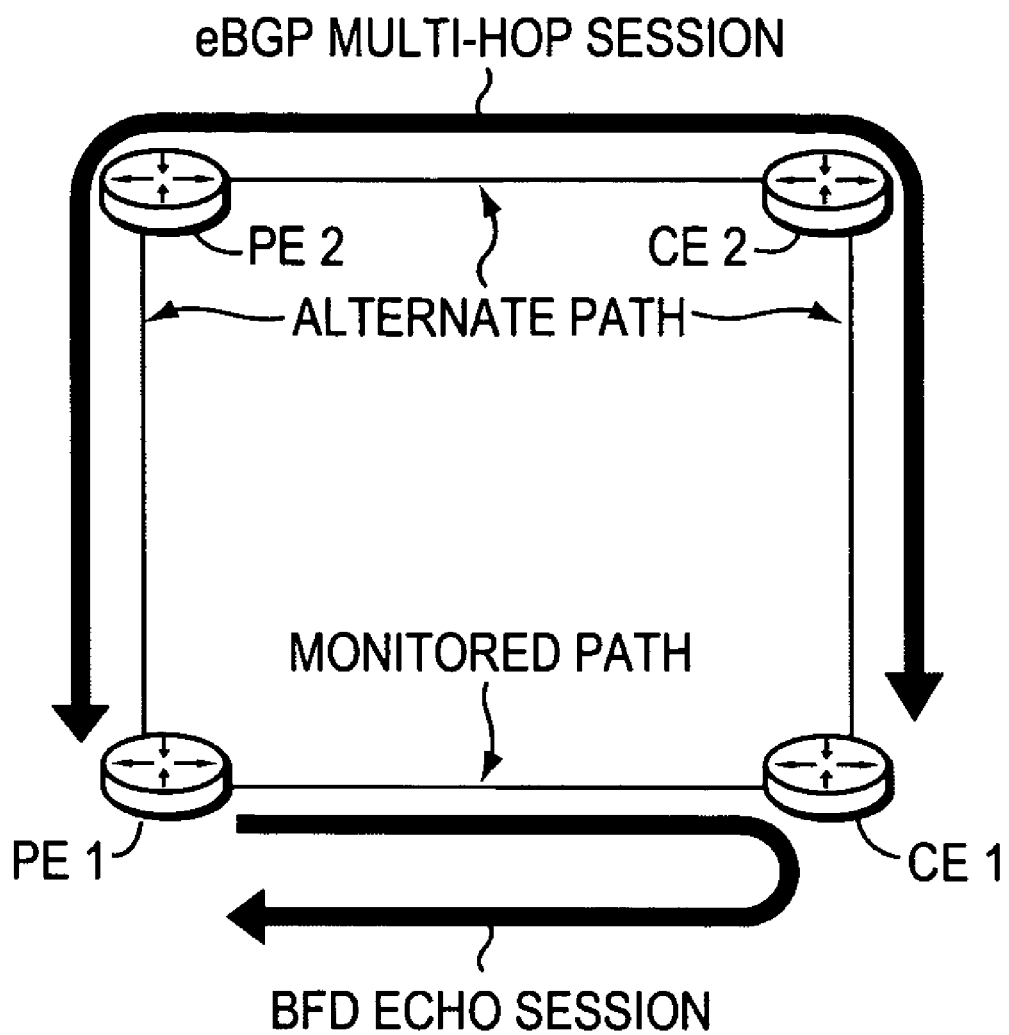
FIG. 5 is an example of the computer network of FIG. 1 configured with a BFD session and BGP session between two devices that may be advantageously used with the present invention.

In accordance with another aspect of the present invention, the first edge device may be configured with a BFD Echo session from X to X, such that BFD Echo messages 400 sent from the first edge device to the second edge device are simply returned to the first edge device over the monitored path (i.e., without having been processed by the second edge device). FIG. 5 is an example of the computer network 100 of FIG. 1 configured with a BFD Echo session from PE1 to CE1. The Echo session is illustratively mapped in such a way so as to receive the returned Echo message at the first edge device's interface to the monitored path (i.e., to the second edge device). As those skilled in the art will understand, the interface may be in reference to a VPN, such as part of a VRF instance for the second edge device. Notably, due to the nature of a BFD Echo session, the second edge device need not be configured for BFD in order to return the Echo messages 400. In other words, the second edge device examines the encapsulated protocol header 410 of the Echo messages, e.g., a TCP/IP header, to determine where to send the packet according to the destination address 413, without having to understand the contents or purpose of the message. For example, PE1 sends a BFD Echo message 400 to CE1 with a destination address for PE1 (e.g., address X) over the monitored path PE1-CE1, thus, in essence, sending the message to itself through CE1. Upon receiving the BFD Echo message and being unaware that it is a BFD message, CE1 simply forwards the message back to PE1 according to the destination address.

Also, an eBGP multi-hop session may be established between the first and second edge devices, such that the eBGP multi-hop session is over the alternate path (i.e., not including the monitored path), e.g., along the links PE1-PE2-CE2-CE1, shown in FIG. 5. Notably, the eBGP session is established from the first edge device (PE1) to an address of the second edge device (e.g., CE1's loopback address Y) that is reachable excluding the monitored path in order to ensure that the first edge device may still reach the second edge device in the event the monitored path fails. Again, in the case of VPN routing, PE1's interface address (e.g., X) may be in a VRF context for CE1. As those skilled in the art will understand, the eBGP session is not necessarily a multi-hop session, such as in the case where a redundant direct link exists between PE1 and CE1 (e.g., PE1'-CE1', mentioned above), and the use of a multi-hop session is merely an example.

In accordance with yet another aspect of the present invention, to detect the status of the monitored path, the first edge device observes the BFD Echo messages. While the first edge device continues to receive the returned BFD Echo message, the monitored path is determined to be operational. In the event, however, that the first edge device (PE1) does not receive a returned BFD Echo message (from CE1), the first edge device (e.g., with BFD services 244) determines that the monitored path is down (i.e., has failed). Those skilled in the art will understand that a monitored path failure may be due to any number of circumstances where the BFD echo message 400 may have been lost en route, such as, e.g., link failure (PE1-CE1), node failure (CE1), line card failure (on CE1), etc.

In response to the failure, (e.g., once BFD services 244 informs BGP services 249 of the failure), the first edge device then sends a notification to the second edge device through the eBGP session over the alternate path. For instance, BGP services 249 of PE1 may create and transmit a BGP NOTIFICATION message 300 to CE1 (e.g., at address Y) over the alternate path PE1-PE2-CE2-CE1, notifying CE1 of the path failure. The NOTIFICATION message may be of any type that indicates a link failure, or at least that instructs the second edge device to break the eBGP session as well. For example, a conventional Cease notification is generally used (i.e., in the absence of any fatal BGP errors) to instruct the receiving device to close (break) the eBGP session. Also, a Hold Timer expired notification may be used in the same manner. Alternatively, a BFD Failure notification type (e.g., type TBD) may be used to indicate the link failure as discovered by BFD monitoring in accordance with the present invention, however those skilled in the art will understand that some BGP and/or BFD configuration may be required on the second edge device to at least interpret the novel notification type. Notably, other BGP notification types may be used in accordance with the present invention, and also other BGP messages, such as a BGP UPDATE message (not shown) showing the down link, PE1-CE2, may be used.

Once the first edge device, PE1, transmits the BGP message 300, it breaks (tears down) the eBGP session to the second edge device, CE1. Through the alternate path, (i.e., because the monitored path has failed) the second edge device, CE1, learns that the monitored path has failed, and also breaks the eBGP session, thus completing the notification of monitored path failure to both edge devices. Because PE1 learns of the failure of PE1-CE1 using BFD, and then substantially immediately informs CE1 of the failure through the established eBGP session, the first and second edge devices both detect the failure in substantially no BFD hold-time. As those skilled in the art will appreciate, this provides a much faster convergence time over conventional BGP KEEPALIVE messages (e.g., 3 seconds), where BFD response time is very fast (e.g., 50 ms) for PE1. Further, in accordance with the present invention, CE1 learns of the failure quickly through the BGP notification over an established eBGP session, therefore realizing substantially the same benefit of a BFD capable device, but without requiring BFD configuration itself.

Figure 6:
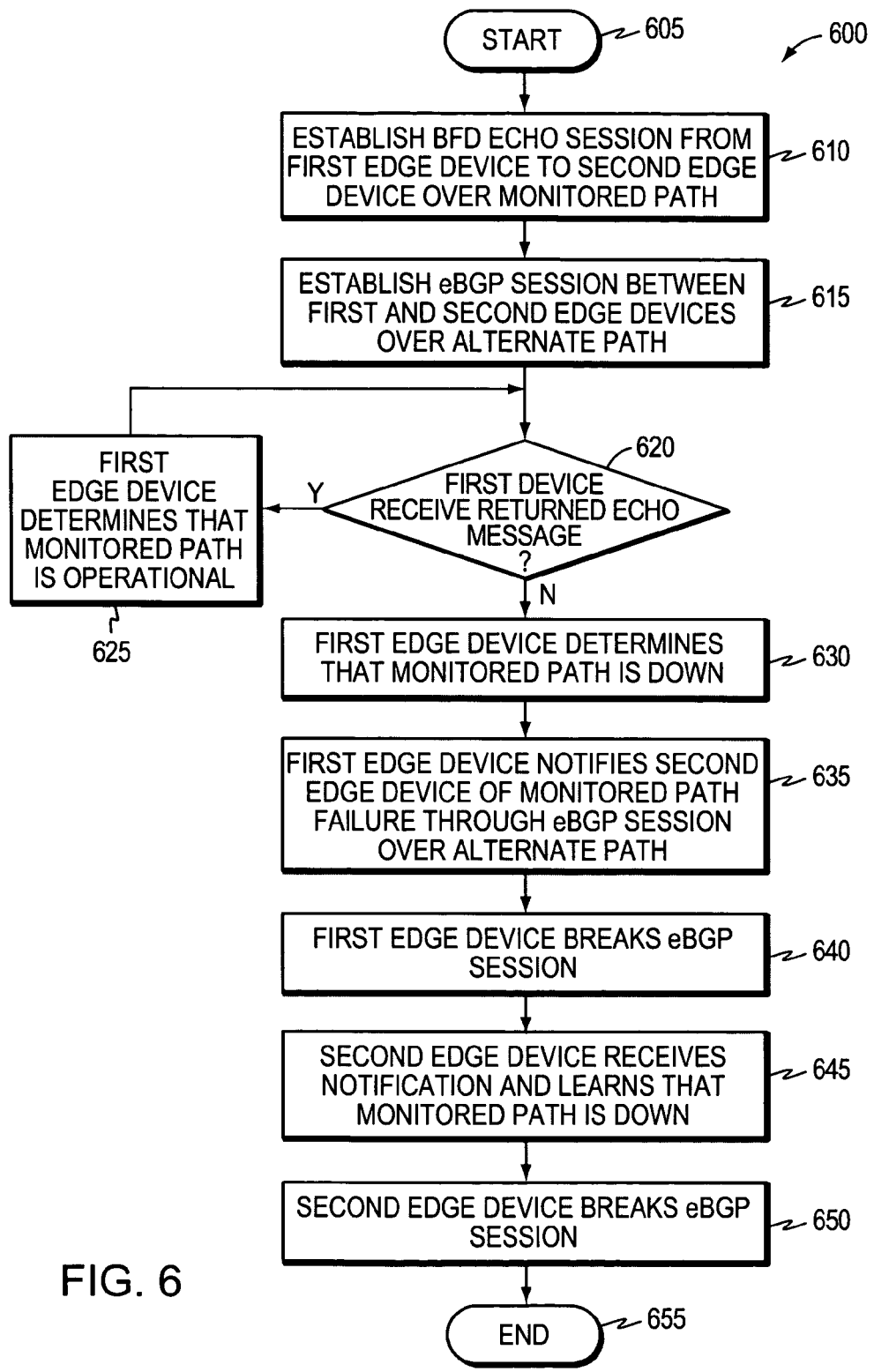
FIG. 6 is a flowchart illustrating a procedure for enabling BFD between first and second edge devices in a computer network, wherein the second edge device is not configured for BFD, in accordance with the present invention.

FIG. 6 is a flowchart illustrating a procedure for enabling BFD between first and second edge devices in a computer network, wherein the second edge device is not configured for BFD, in accordance with the present invention. The procedure 600 starts at step 605, and continues to step 610, where the first edge device (e.g., PE1) establishes a is BFD Echo session to the second edge device (e.g., CE1) over the monitored path (e.g., PE1-CE1). In other words, the first edge device establishes the BFD Echo session to the first edge device (itself) via the second edge device. At step 615, an eBGP session is established between the first and second edge devices over the alternate path (e.g., PE1-PE2-CE2-CE1). Upon establishing the Echo session, the first edge device sends BFD Echo messages over the monitored path to the second edge device, which responds with returned BFD Echo messages to the first edge device. While the first edge device continues to receive returned BFD Echo messages from the second device at step 620, the first edge device determines that the monitored path is operational in step 625. If, on the other hand, at step 620 the first edge device does not receive a returned BFD Echo message, the first edge device determines that the monitored path is down in step 630.

Once the monitored path is down (i.e., has failed), the first edge device notifies the second edge device of the failure through the eBGP session established over the alternate path in step 635. Notably, as illustratively mentioned above, BFD services 244 may inform BGP services 249 of the failed path, which services 249 responds by sending a BGP NOTIFICATION message to the second edge device. The first edge device may then break the eBGP session to the second edge device at step 640. Upon receiving the eBGP notification at step 645, the second edge device learns that the monitored path is down, thus completing the notification of monitored path failure to both edge devices with substantially zero BFD holdtime, as described above. The second edge device subsequently breaks the eBGP session in step 650 accordingly, and the procedure ends at step 655.

Advantageously, the novel technique enables BFD between first and second edge devices in a computer network, wherein the second edge device is not configured for BFD. By observing BFD Echo messages at a first edge device and sending notification of failure to a second edge device through an established eBGP session, the novel technique allows for the operation (and resultant benefits) of BFD between the two devices even though the second edge device is not configured for BFD. Also, the single edge device configuration for BFD obviates the requirement to configure all edge devices with BFD, thereby possibly saving time and money for network administrators (e.g., by configuring PE devices and not CE devices).

While there has been shown and described an illustrative embodiment that enables BFD between first and second edge devices in a computer network, wherein the second edge device is not configured for BFD, it is to be understood that various other adaptations and modifications may be made within the spirit and scope of the present invention. For example, the invention has been shown and described herein using an eBGP multi-hop session over the alternative path. However, the invention in its broader sense is not so limited, and may, in fact, be used with an eBGP session over a single-hop alternative path, such as, e.g., redundantly paired direct links between the first and second edge devices. Also, the use of eBGP is only one example of an alternative notification means for use with the present invention, and those skilled in the art will understand that other means may also be used. Also, while the invention has been shown and described for use with edge devices (particularly PE and CE devices), the invention may, in fact, be used with any type of node that may benefit from the use of BFD, as will be understood by those skilled in the art. Further, those skilled in the art will understand that while the examples given above sometimes refer to VPNs and VRF contexts, these virtual embodiments are merely representative examples, and that the present invention may equally be used with physical interfaces, addresses, etc.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for enabling bidirectional forwarding detection (BFD) between first and second edge devices in a computer network, wherein the second edge device is not configured for BFD, the method comprising:
   establishing a BFD Echo session from the first edge device to the first edge device via the second edge device along a monitored path;
   establishing an external border gateway protocol (eBGP) session between the first and second edge devices over an alternate path;
   sending one or more BFD Echo messages from the first edge device to the second edge device over the monitored path;
   determining that the monitored path is down upon not receiving a returned BFD Echo message at the first edge device from the second edge device; and, in response,
   notifying the second edge device that the monitored path is down through the eBGP session over the alternate path.

2. The method as in claim 1, further comprising:
   breaking the eBGP session at the first edge device upon notifying the second edge device that the monitored path is down.

3. The method as in claim 1, further comprising:
   breaking the eBGP session at the second edge device upon receiving notification that the monitored path is down.

4. The method as in claim 1, wherein the first edge device is a provider edge (PE) device located on the edge of a provider network.

5. The method as in claim 1, wherein the second edge device is a customer edge (CE) device located on the edge of a customer network.

6. The method as in claim 1, further comprising:
   establishing the BFD Echo session using an address of the first edge device that is reachable only from the second edge device along the monitored path.

7. The method as in claim 6, wherein the address of the first edge device is in a virtual routing/forwarding (VRF) context.

8. The method as in claim 1, further comprising:
establishing the eBGP session between a first address of the first edge device and a second address of the second edge device, the first and second addresses reachable from one or more devices along the alternate path other than the first and second edge devices.

9. The method as in claim 8, wherein the second address is a loopback address of the second edge device.

10. The method as in claim 1, further comprising:
establishing the eBGP session as an eBGP multi-hop session over the alternate path.

11. The method as in claim 1, wherein the monitored path is a link between the first and second edge devices.

12. The method as in claim 1, further comprising:
determining that the monitored path is operational upon receiving a returned BFD Echo message at the first edge device from the second edge device.

13. The method as in claim 1, wherein a BFD process of the first edge device informs a BGP process of the first edge device that the monitored path is down, the BGP process notifying the second edge device that the monitored path is down through the eBGP session over the alternate path.

14. The method as in claim 1, wherein the first and second edge devices are located at edges between a pair of redundant virtual private network (VPN) sites.

15. A system for enabling bidirectional forwarding detection (BFD) for a monitored path in a computer network, the system comprising:
a first edge device configured for BFD; and
a second edge device not configured for BFD; wherein
i) the first edge device is configured to establish a BFD Echo session to the first edge device via the second edge device along the monitored path,
ii) the first and second edge devices are configured to establish an external border gateway protocol (eBGP) session between the devices over an alternate path,
iii) the first edge device is further configured to determine that the monitored path is down upon not receiving a returned BFD Echo message from the second edge device, and, in response,
iv) the first edge device is further configured to notify the second edge device that the monitored path is down through the eBGP session over the alternate path.

16. A system for enabling bidirectional forwarding detection (BFD) between first and second edge devices in a computer network, wherein the second edge device is not configured for BFD, the system comprising:
means for establishing a BFD Echo session from the first edge device to the first edge device via the second edge device along a monitored path;
means for establishing an external border gateway protocol (eBGP) session between the first and second edge devices over an alternate path;
means for sending one or more BFD Echo messages from the first edge device to the second edge device over the monitored path;
means for determining that the monitored path is down upon not receiving a returned BFD Echo message at the first edge device from the second edge device; and, in response,
means for notifying the second edge device that the monitored path is down through the eBGP session over the alternate path.

17. A node for enabling bidirectional forwarding detection (BFD) for a monitored path, the node comprising:
one or more network interfaces;
a processor coupled to the one or more network interfaces and adapted to execute software processes; and
a memory adapted to store at least a BFD process and a border gateway protocol (BGP) process executable by the processor, the BFD and BGP processes configured to:
i) establish a BFD Echo session to the node via a second node along the monitored path, the second node not configured for BFD, ii) establish an exterior BGP (eBGP) session with the second node over an alternate path, iii) send one or more BFD Echo messages from the node to the second node over the monitored path, iv) determine that the monitored path is down upon not receiving a returned BFD Echo message from the second node, and, in response, v) notify the second node that the monitored path is down through the eBGP session over the alternate path.

18. The node as in claim 17, wherein the BGP process is further configured to break the eBGP session after the one or more BFD Echo messages are sent from the node to the second node.

19. The node as in claim 17, wherein the node is a provider edge (PE) device located on the edge of a provider network.

20. The node as in claim 17, wherein the second node is a customer edge (CE) device located on the edge of a customer network.

21. The node as in claim 17, wherein the BFD process is further configured to establish the BFD Echo session using an address of the node that is reachable only from the second node along the monitored path.

22. The node as in claim 21, wherein the address of the node is in a virtual routing/forwarding (VRF) context.

23. The node as in claim 17, wherein the BFD process is further configured to establish the eBGP session as an eBGP multi-hop session over the alternate path.

24. The node as in claim 17, wherein the monitored path is a link between the node and second node.

25. A non-transitory computer readable storage medium storing executable program instructions for enabling bidirectional forwarding detection (BFD) between first and second edge devices in a computer network, wherein the second edge device is not configured for BFD, the executable program instructions comprising program instructions for:
establishing a BFD Echo session from the first edge device to the first edge device via the second edge device along a monitored path;
establishing an external border gateway protocol (eBGP) session between the first and second edge devices over an alternate path;
sending one or more BFD Echo messages from the first edge device to the second edge device over the monitored path;
determining that the monitored path is down upon not receiving a returned BFD Echo message at the first edge device from the second edge device; and, in response,
notifying the second edge device that the monitored path is down through the eBGP session over the alternate path.

26. A method for enabling bidirectional forwarding detection (BFD) between first and second edge devices in a computer network, wherein the second edge device is not configured for BFD, the method comprising:

establishing a BFD Echo session from the first edge device to the first edge device via the second edge device along a monitored path;

establishing an alternate path from the first edge device to the second edge device;

sending one or more BFD Echo messages from the first edge device to the second edge device over the monitored path;

determining that the monitored path is down upon not receiving a returned BFD Echo message at the first edge device from the second edge device; and, in response, notifying the second edge device that the monitored path is down over the alternate path.

27. The method as in claim 26, wherein notifying the second edge device that the monitored path is down comprises:

sending a notification message indicating an error from the first edge device to the second edge device, in response to the determination that the monitored path is down.

* * * * *

UNITED STATES PATENT AND TRADEMARK OFFICE
CERTIFICATE OF CORRECTION

PATENT NO. : 7,765,306 B2  
APPLICATION NO. : 11/342446  
DATED : July 27, 2010  
INVENTOR(S) : Clarence Filsfils Page 1 of 1

It is certified that error appears in the above-identified patent and that said Letters Patent is hereby corrected as shown below:

Col. 5, Line 44, please replace "message) is is not" with "message) is not"

Col. 13, Line 9, please replace "establishes a is BFD" with "establishes a BFD"

Signed and Sealed this
Twenty-second Day of March, 2011

David J. Kappos
*Director of the United States Patent and Trademark Office*